Aug. 18, 1959 — M. L. EDWARDS — 2,900,112
PUMP MOUNTINGS
Filed Feb. 3, 1956 — 4 Sheets-Sheet 3

Inventor
MILES LOWELL EDWARDS
By … Attys

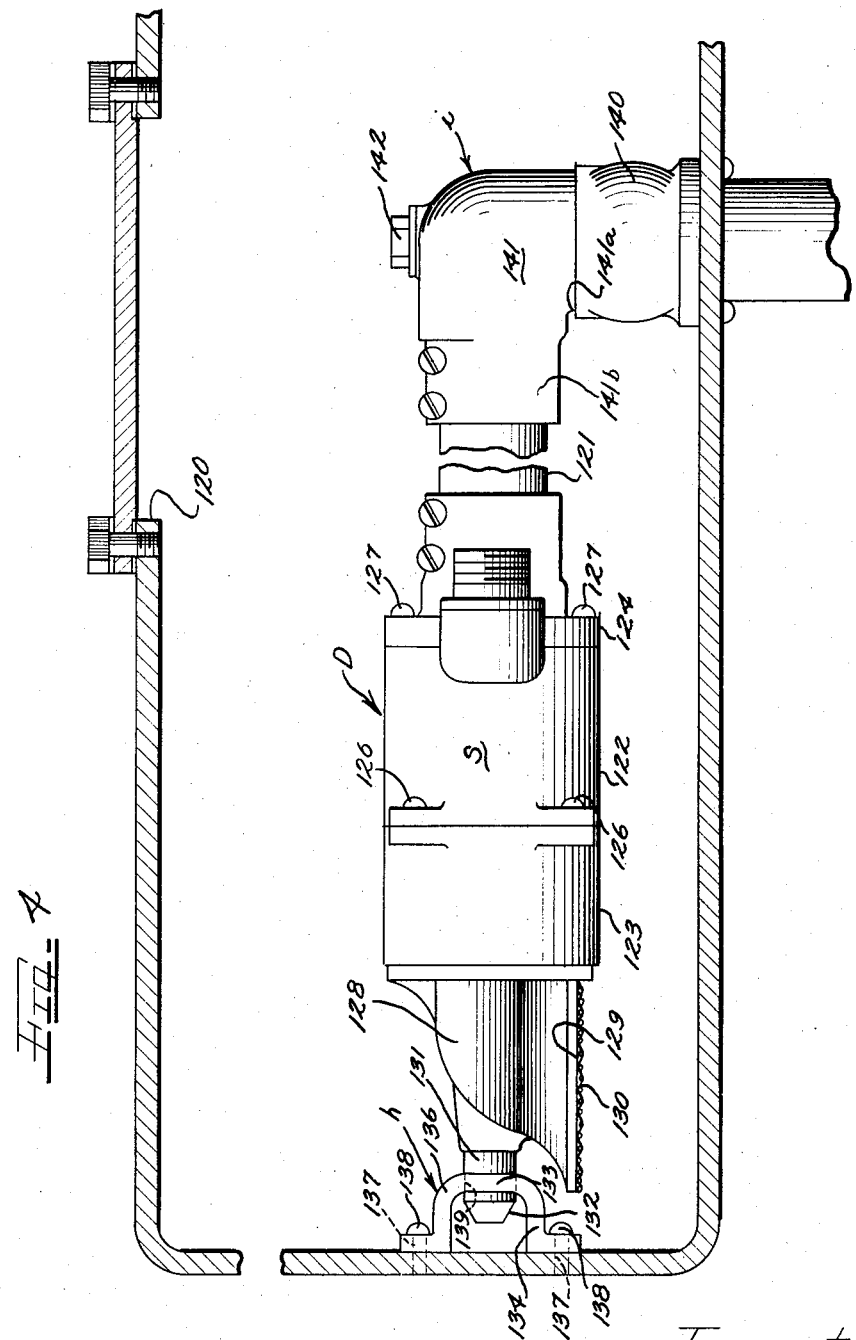

United States Patent Office 2,900,112
Patented Aug. 18, 1959

2,900,112

PUMP MOUNTINGS

Miles Lowell Edwards, Portland, Oreg.

Application February 3, 1956, Serial No. 563,283

11 Claims. (Cl. 222—180)

This invention relates to the mounting of fluid flow devices, such as pumps, in tanks whereby the devices can be easily installed and replaced through small remote tank openings without draining the tank contents. More specifically, this invention relates to the mounting of electric motor driven vapor separating booster pumps in fuel cells whereby the pump and motor unit is easily plugged into a tank-carried fitting and suspended in the cell between the fitting and a tank-carried discharge conduit fitting.

According to this invention, the discharge conduit of a motor driven booster pump unit is secured to a fuel cell carried fitting and the fuel cell carries an internal additional fitting remote from the conduit fitting. The motor driven booster pump unit is thus suspended in the fuel cell from a pair of remote suspension points preferably disposed on different tank walls.

A feature of the invention includes housing and conduit structures of small compact overall diameter so that the assembly can be inserted in the fuel cell through a very small access opening.

Another feature of the invention resides in conduit and plug-in fittings which accommodate reception and removal of the pump assembly without draining the contents of the fuel cell.

It is then an object of this invention to provide mounting arrangements for fluid flow devices whereby such devices may easily be "plugged into" tanks from remote openings in the tanks.

Another object of the invention is to provide electric motor driven pump units and mounting fittings therefor whereby the units can be quickly and easily plugged into tanks without draining the contents of the tanks.

A still further object of the invention is to provide a submerged electric motor driven booster pump unit that can be inserted in a fuel cell through a small access hole and secured in operative position in the cell by a first fitting on one wall of the cell and a second remote fitting on another wall of the cell.

A still further object of this invention is to provide an electric motor driven booster pump unit for aircraft fuel cells and the like, which is insertable through a small access hole in the top of the fuel cell and is easily plugged into position in the cell to be fixedly supported therein.

A still further object of the invention is to provide an electric motor driven booster pump unit of relatively small overall diameter that is easily inserted into the fuel cell through a small access hole and which has a discharge conduit readily attached to one wall of the fuel cell and a remote male plug portion for seating in a fitting carried by a remote wall of the fuel cell.

A specific object of the invention is to provide an electric motor driven booster pump unit with a male plug-in portion adjacent the unit and a rigid discharge conduit including a fitting carried by a closure plate for the access hole.

Other and further objects of the invention will be apparent to those skilled in this art from the following detailed description of the annexed sheets of drawings which, by way of preferred examples only, illustrate several embodiments of the invention.

On the drawings:

Figure 4 is a side elevational view, with parts in cross-section, of another modified form of the present invention, in which the pump assembly is horizontally disposed in a shallow fuel cell and carried by the side and bottom walls thereof.

As shown on the drawings:

Figure 1:
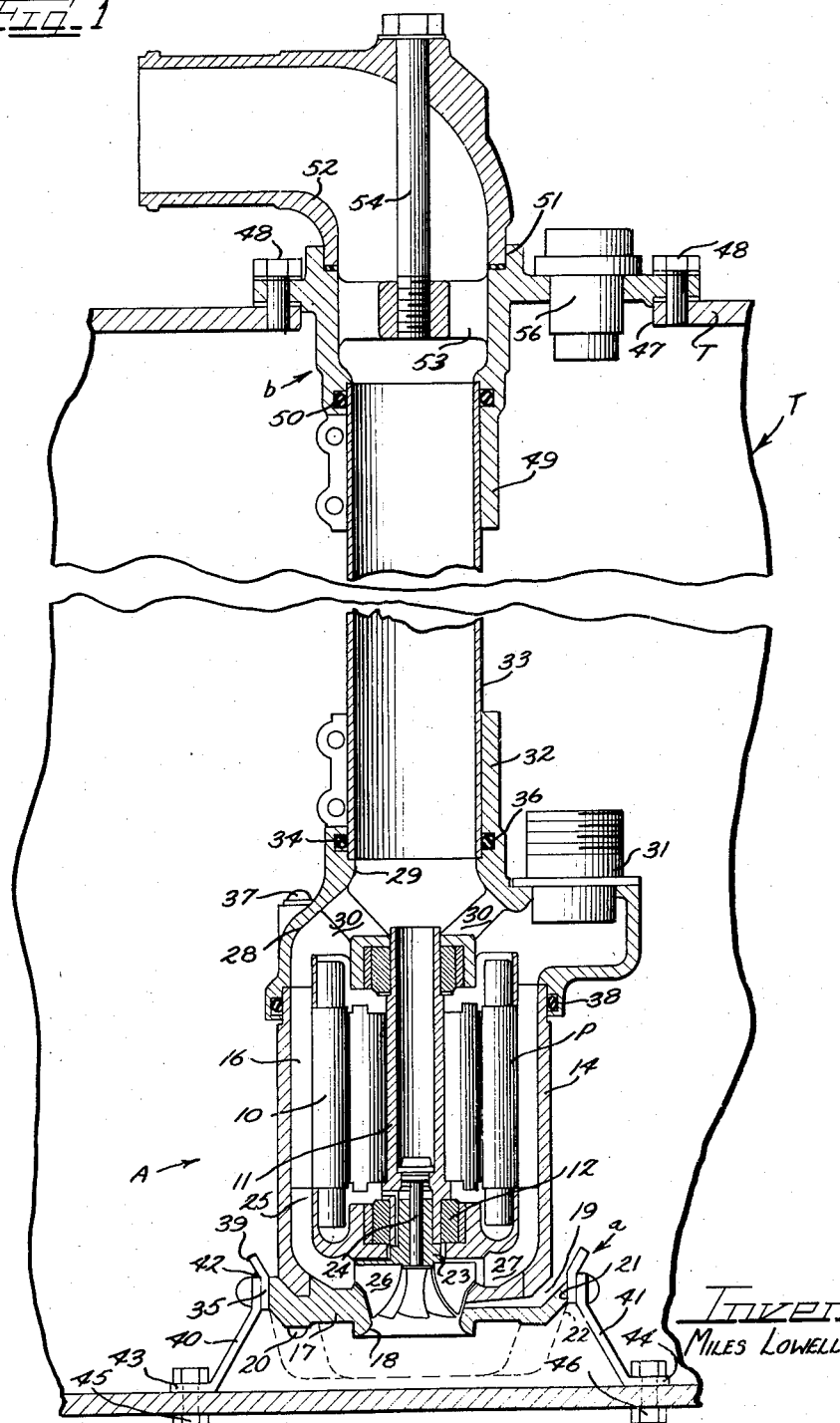
Figure 1 is a cross-sectional view, with parts in elevation, showing the pump assembly of the present invention vertically carried by the top and bottom walls of an aircraft fuel cell.

In Figure 1, an electric motor driven fuel booster pump installation A is shown mounted in vertical position in a typical aircraft fuel cell T. The pump installation A, is comprised generally of a rotary pump assembly P, a mounting bracket assembly *a* and a combination closure and discharge fitting member *b*.

The rotary pump assembly P, shown in Figure 1, is comprised generally of an electric motor 10 having a hollow armature shaft 11. The armature shaft 11 is journaled at its lower end by a bearing assembly 12 and at its upper end by a bearing assembly 13. A pump casing 14 encloses the electric motor assembly 10 and provides an annular discharge flow passage 16 between the motor and casing.

The lower end of the pump assembly P is closed by an end plate or throat ring 17 in which is formed a centrally disposed inlet 18. Arcuate vapor removal slots such as 19 intersect the inlet 18 at a point downstream to discharge vapors or vapor-rich fluid laterally from the pump away from the inlet. Suitable fasteners 20 secure the end plate 17 to the casing 14. The end plate 17 has a slightly larger diameter than the pump casing 14 to provide a lip directing the vapors upwardly and providing a pilot side wall 21 to engage in the mounting bracket assembly *a*. A screen 22 spans the inlet 18 to prevent the entry of sediment or other foreign particles.

A rotary centrifugal flow impeller 23 is carried at the lower end of the armature shaft 11 and is positioned in the inlet 18 of the end plate 17. A suitable fastener 24 secures the impeller 23 to the armature shaft 11.

The impeller 23 is provided with a plurality of vanes 26 which induce a flow of pressurized fluid to a diffuser passage 25 equipped with vanes 27 and formed in the lower end of the casing 14. The diffuser passage 25 communicates with the discharge flow passage 16, to circulate fuel around the electric motor assembly 10.

The upper end of the casing 14 is closed by a cover member 28 in which is formed an outlet 29 for the pump assembly P. The electric motor assembly 10 and upper bearing assembly 13 are retained in spaced relationship in the casing 14 by spiders 30 which are integral with the cover member 28.

Pressurized fluid in the annular passage 16 is thus communicated past the spiders 30 to the pump outlet 29 to form a complete flow path.

An electric conduit plug 31 is provided in the cover member 28 to communicate electrical energy to the electric motor assembly 10. The cover member 28 also includes a split contractible conduit retaining sleeve portion 32 which clamps and retains a connecting conduit 33. The outlet 29 in the cover member 28 is in communication with the connecting conduit 33 to form a discharge flow path for pressurized fluid leaving the pump assembly P. Suitable seal means 34 in an annular internal recess 36 prevent leakage of pressurized fluid between the conduit 33 and outlet 29. Suitable fasteners 37 secure the cover 28 to the pump casing 14. An annular seal assembly 38 prevents the leakage of pressurized fluid in the passage 16 between the casing 14 and cover member 28.

The pump assembly P is compact having a minimum overall diameter for insertion through a small access hole in the cell T.

The mounting bracket assembly a includes an annular sleeve member 35 having an outwardly flared top mouth portion 39 to facilitate "plugging in" of the pump assembly A by insertion of the pilot wall 21 into the sleeve.

The sleeve mounting member 35 is maintained in spaced relationship from the bottom wall of the fuel cell T by depending leg members 40 and 41 welded to the member 35. The legs 40 and 41 have outturned feet 43 and 44, respectively, fastened to the bottom wall of the tank T by fasteners 45 and 46.

The mounting bracket assembly a shown in Figure 1, will maintain the pump assembly P in spaced relationship above the bottom wall of the fuel cell T and will permit an installation or removal of the pump assembly P without draining the contents of the cell T.

The combination closure and discharge flow fitting member b closes an access hole 47 in the fuel cell T and is secured to the top wall of the fuel cell T by fasteners 48.

A clamping sleeve portion 49 is provided on the combination closure and flow discharge fitting member b to retain the discharge conduit 33. An annular seal assembly 50 prevents the leakage of pressurized fluid between the conduit 33 and sleeve portion 49.

The closure and flow discharge member b is bored as at 51 to interchangeably receive an appropriate discharge flow fitting, such as a flow elbow 52. A centrally threaded spider 53 in the combination closure and flow discharge member b receives a suitable fastener 54 to retain the flow fitting 52 in sealed engagement. An electrical conduit member 56 is carried by the closure and flow member b.

Thus, it should be appreciated that the vertically mounted pump assembly A of Figure 1, is easily plugged into and removed from the tank T through a small access hole 47 and is firmly and fixedly carried in the tank by a bottom wall female plug and a conduit fitting carried by the closure plate for the access hole. The conduit pipe 33 is rigid to hold the pilot wall 21 of the pump in the sleeve 35 and can be cut to the desired length for spanning the space between the clamps 32 and 49. To remove the assembly A it is only necessary to unfasten the access hole cover and lift the entire pump out of the hole.

Figure 2:
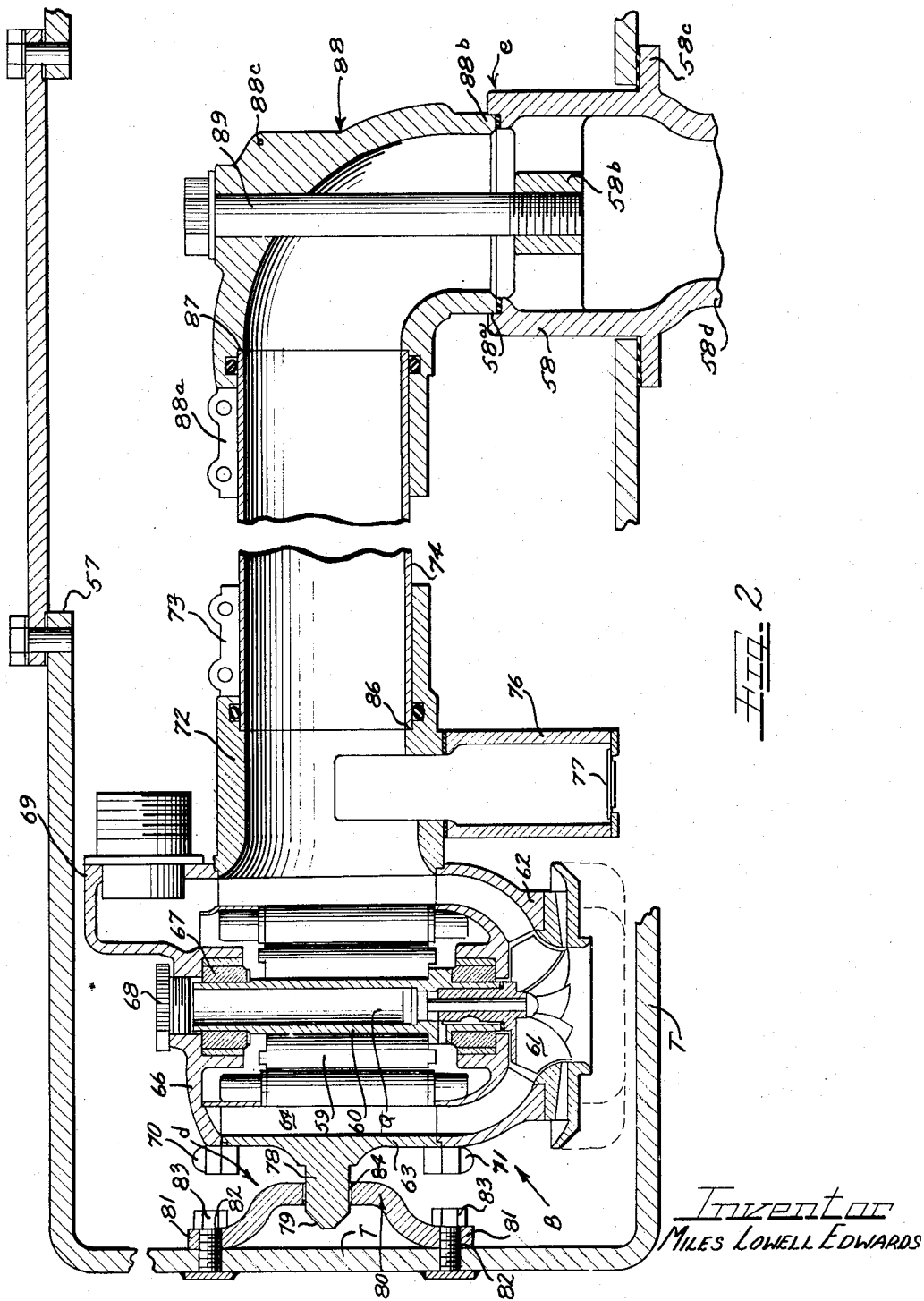
Figure 2 is a cross-sectional view, with parts in elevation, illustrating a modified form of the present invention in which the fuel pump assembly is carried by the side and bottom walls of an aircraft fuel cell, at a point remote from an access hole.

Referring now to Figure 2, a modified side and bottom wall mounting arrangement of the present invention is illustrated in which an electric motor driven fuel booster pump installation B is located adjacent a side wall of a fuel cell T at a remote point from the top wall access hole 57.

In Figure 2, the installation B is comprised generally of a pump assembly Q, a side wall mounting bracket d, and a combination closure and flow discharge fitting member e, carried by the bottom tank wall aligned with the hole 57 and constituting a spider equipped hose connector 58.

The pump assembly Q is substantially identical to the pump assembly P, shown in Figure 1, to which reference should be made for a more detailed description of the component parts and general operation.

The pump assembly Q is comprised generally of an electric motor assembly 59 having a hollow armature shaft 60. A rotary impeller assembly 61 is carried at the lower end of the armature shaft 60 and is enclosed by a housing 62 providing a diffuser vane equipped flow path for fuel from the impeller. A casing 63 encloses the electric motor assembly 59 in spaced relation to form an annular discharge flow passage 64 receiving fuel from the diffuser vane passage.

A cover assembly 66 closes the upper end of the casing 63, and includes a bearing assembly 67, an inspection plug 68 and an electric conduit assembly 69. Suitable fasteners 70 and 71 retain the cover assembly 66 and pump housing 62 to the casing 63.

A side wall discharge outlet 72 is formed in the pump casing 63 and a conduit clamp assembly 73 formed on the outlet 72 retains a connecting conduit 74.

A bypass assembly 76 communicates with the outlet 72 downstream of the fuel booster pump assembly Q to permit an uninterrupted flow of working fluid through a check valve assembly 77 in the event of failure or obstruction of the main fuel booster pump assembly Q.

The casing 63 of the fuel booster pump assembly Q is also provided with an integral transversely depending support prong 78 which is provided with a tapered end portion 79 to facilitate engagement with the mounting bracket assembly b.

The mounting bracket assembly d is comprised generally of a U-shaped member 80 having a pair of flanged mounting leg portions 81. The mounting legs 81 are bored as at 82 to receive suitable fasteners 83, which secure the bracket assembly d to the side wall of the fuel cell T.

The bracket assembly d is centrally bored as at 84 to receive and journal the depending support prong 78 of the fuel booster pump assembly Q.

It will thus be appreciated that the mounting bracket assembly d and depending support prong 78 on the pump assembly Q, cooperate to maintain the pump assembly Q at a predetermined level to position the pump inlet close to the bottom wall of the tank.

The discharge conduit 74 is bottomed at one end on a shoulder 86 of the outlet 72 and at the other end on a shoulder 87 of an elbow conduit 88 having one leg equipped with a contractible clamp portion 88a like the clamp 73, and the other leg 88b fitted into a pilot bore 58a of the coupling 58. The bend of the elbow has a boss 88c receiving a mounting bolt 89 threaded into a spider carried boss 58b of the coupling 58 to bottom the elbow against a gasket in the pilot bore 58a. The coupling 58 has a flange 58c overlying the bottom of the tank and secured thereto and a hose receiving end 58d projecting from the tank.

The fitting e is preferably located just below the access hole 57 so that the bolt 89 can easily be tightened into or removed from the coupling 58. The conduit tube 74 is rigid and can be cut to the necessary length for spanning the space between the clamps 73 and 88a to seat the prong 78 in the fitting d when the elbow 88 is seating in the fitting e. The two tank carried fittings coact to rigidly secure the pump assembly Q in the tank.

Figure 3:
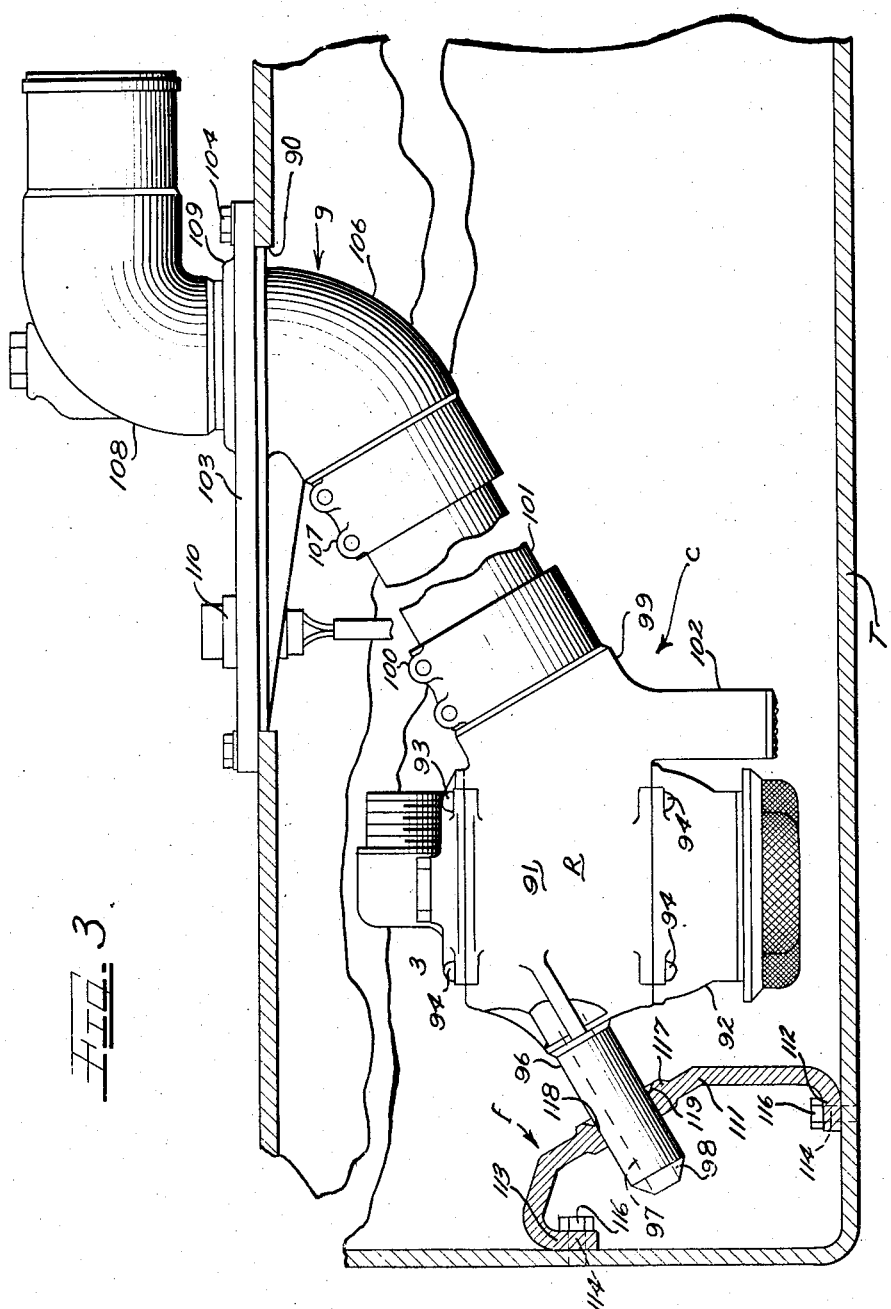
Figure 3 is a side elevational view, with parts in cross-section, illustrating another modified form of the present invention showing a pump assembly carried by the top and corner, side and bottom walls of an aircraft fuel cell.

Referring now more particularly to Figure 3, an installation C is shown in a corner of a fuel tank T remote from the tank access hole 90.

The installation C includes a pump assembly R which is substantially similar to the pump assembly P shown in Figure 1, to which reference should be made for a more detailed description of the component parts and operating cycle, a corner bracket f and a discharge fitting g.

The pump R is comprised generally of a central casing 91, a lower depending pump housing 92 and a cover member assembly 93. Suitable fasteners 94 retain the cover member and pump housing on the casing 91.

An angularly inclined depending support prong 96 is formed on a side wall of the casing 91. The support prong 96 is centrally bored as at 97 for weight reduction purposes, and includes a tapered end portion 98 which facilitates engagement with the corner mounting bracket f.

An outlet coupling 99 is formed on the casing 91 on which is formed an integral sleeve clamp assembly 100 to sealingly retain a connecting conduit 101. A bypass valve assembly 102 communicates with the outlet 99 to form an emergency flow passage in the event of failure or obstruction of the fuel booster pump assembly R.

A combination closure and flow discharge fitting member 103 closes the access hole 90 in the fuel cell T and is removably retained on the fuel cell T by a plurality of fasteners 104.

The combination closure and flow discharge fitting member 103, shown in Figure 3, is comprised generally of an internal conduit receiving member 106 which is provided with an integral clamp sleeve 107 to prevent leakage of pressurized working fluid.

A discharge elbow fitting 108 engages a flow fitting boss 109 on the combination closure and flow fitting member 103 to direct the discharge flow away from the fuel cell T and while only the flow fitting elbow 108 is shown in Figure 3, it should be understood that any other desired flow fitting could be substituted, depending upon the particular installation.

An electric conduit plug assembly 110 is also shown positioned in the combination closure and flow fitting discharge member 103 for exemplary purposes, though it should be understood that the electric conduit 110 could be placed in any other convenient location on the fuel cell T.

The corner mounting bracket f is comprised generally of a generally C-shaped member 111 having a pair of feet 112 and 113, which are bored as at 114 to receive fasteners 116. The fasteners 116 may be threaded into the fuel cell wall or engage other cooperating retention means on the outside of the fuel cell T, not shown.

The bracket 111 is provided with a centrally disposed boss 117 which is bored at 118 to receive and journal the depending support prong 96 on the fuel booster pump assembly C. The bore 118 is chamfered as at 119 to facilitate insertion or removal of the depending support prong 96.

Thus, it will be appreciated that the fuel booster pump assembly C illustrated in Figure 3, illustrates a novel form of the present invention in an upwardly inclined corner bracket carried by the bottom and side tank walls and faces the access hole of the tank to facilitate reception of the pump prong. The access hole cover is attached to the pump through a rigid conduit tube and removal of the cover effects automatic removal of the pump from its corner bracket.

Referring now to Figure 4, there is disclosed a horizontal installation D including a scavenger or booster pump assembly S, a mounting bracket assembly h and a combination closure and flow discharge fitting i. The bracket h is carried by a side wall of the tank near the bottom, the fitting i is carried by the bottom wall of the tank and the access hole 120 of the tank is above the fitting i. A rigid conduit tube 121 spans the space between the fitting i and the pump S.

The pump assembly S is substantially identical to the assembly P shown in Figure 1 except that in Figure 4, the pump assembly S has been angularly displaced through an angle of 90°, relative to the pump assembly P and to which reference should be made for a more detailed description of the component parts and operation.

The pump assembly S is comprised of a centrally disposed casing 122, a pump housing 123 and a cover member assembly 124. A plurality of fasteners 126 and 127 retain the pump housing 123 and cover member assembly 124 to the pump casing 122, respectively.

A downwardly opening suction elbow 128 abuts the pump housing 123 to form a right angled, shallow level, flow inlet 129 for the pump assembly S. A filter screen 130 is provided in the inlet of the suction elbow 128 to prevent the entry of sediment particles.

An integral support prong 131 is provided on the suction elbow 128 and includes a tapered end portion 132 to facilitate insertion in the mounting bracket h.

It will be appreciated that the provision of the suction elbow inlet 128 for the pump assembly S, permits the fuel booster pump assembly D to operate effectively in a very shallow fuel level environment before cavitation occurs.

The bracket assembly h is comprised generally of a depending U-shaped member 133 having a pair of flanged depending leg portions 134 and 136, respectively, which are bored as at 137 to receive a plurality of fasteners 138. The support bracket 133 is centrally bored as at 139 to receive and journal the depending support prong 131 on the pump assembly S.

The fitting i includes a coupling 140 mounted in the bottom wall of the tank and receiving one leg 141a of an elbow 141 that is bolted thereto by a mounting bolt 142 which is easily accessible from the access hole 120. The other leg 141b of the elbow is clamped to the tube 121.

The pump assembly D is particularly advantageous in that the horizontal or prone installation makes possible a submerged installation in an extremely shallow fuel cell such as are used in thin-winged supersonic aircraft. In addition, the fuel pump assembly D will function quite satisfactorily as a scavenging pump in the more conventionally dimensioned fuel cells, whenever a virtually complete scavenging action is desired.

It will also be appreciated that a wide latitude of interchangeability exists between the various pump configurations, illustrated in Figures 1 to 4, and that many other pump assembly arrangements and installations are possible with little or no modifications.

Although only four embodiments of the present invention are herein illustrated, many other modifications and variations may be effected without departing from the scope of the novel concepts of the present invention.

I claim as my invention:

1. In combination with a fuel cell having top, bottom and side walls with an access hole in the top wall and an outlet opening in the bottom wall aligned with the access hole, a mounting bracket in the tank on a side wall, a coupling on the bottom wall of the tank projecting through the outlet opening, an electric motor driven pump unit having a bottom inlet and a side outlet, a prong on said unit slidably engageable with said bracket, an elbow fitting detachably mounted on said coupling, and a rigid tube connecting the outlet with the elbow unit whereby the coupling, rigid tube and the bracket will rigidly suspend the pump unit in the tank in spaced relation from the bottom wall thereof.

2. In combination with a fuel cell having top, bottom and side walls and an access hole in the top wall, a mounting bracket in said cell secured in a corner thereof to the side and bottom walls and having a female portion facing the access hole, a closure for said access hole, a discharge fitting on said closure for conveying fuel through the top of the cell, a motor driven pump unit in said cell having a prong portion telescopically engageable with the bracket and an outlet portion facing the access hole, and a rigid discharge conduit connecting the fitting of the closure with the outlet portion whereby the rigid conduit and the closure cooperate to longitudinally rigidly suspend the unit in the tank and the bracket prevents lateral displacements thereof.

3. In combination with a fuel cell having top, bottom and side walls with an access hole in the top wall and an outlet opening in the bottom wall under the access hole, an electric motor driven fuel pump adapted to be plugged into said fuel cell, a bracket secured on a side wall of said fuel cell remote from said access hole, a coupling secured in the bottom wall of said fuel cell through said discharge opening, an elbow fitting detachably mounted on said coupling, a prong on said unit adapted to be plugged into said side wall bracket and slidably receive therein, and a rigid discharge conduit secured to the elbow fitting and to said unit for discharge of fuel from the unit to the coupling, said elbow fitting being removable from said coupling by manipulation from said access hole to release the unit from the bracket and coupling whereby the unit is easily plugged into the bracket and secured to the coupling for suspension in the fuel cell above the bottom wall thereof.

4. A submerged pump assembly adapted for installation and removal through a remote access hole in an aircraft fuel cell or the like, comprising a pump having an inlet and an outlet, a casing enclosing said pump, a mounting bracket assembly, fastening means securing said mounting bracket to at least one wall portion of said fuel cell, projecting support means on said casing, means on said bracket assembly to telescopically receive and journal said projecting support means, a combination closure and flow discharge member closing said access hole, and rigid conduit means communicating the outlet of said pump assembly with said combination closure and flow discharge member and forming the sole supporting connection therebetween, said support means, mounting bracket and conduit means cooperating to maintain said pump assembly in a spaced relationship in said fuel cell, whereby said pump assembly may be installed in or removed from a remote location in said fuel cell through said access hole.

5. A pump assembly, adapted to be installed in an aircraft fuel cell, or the like, through an access hole in said fuel cell, substantially removed from said pump assembly, comprising a rotary pump having an inlet and an outlet, a casing enclosing said pump, a depending support prong on said casing, a combination closure and flow discharge member in a wall of said fuel cell, longitudinally rigid conduit means communicating the outlet of said pump with said combination closure and flow discharge member, and a corner mounting bracket having a bore therein adapted to slidably receive and journal said depending support prong, whereby said mounting bracket, support prong, and rigid conduit means cooperate to retain the pump assembly in spaced relationship in said fuel cell.

6. A pump assembly, adapted for shallow level installation in an aircraft fuel cell, or the like, comprising a pump having an inlet and an outlet, a casing enclosing said pump, a suction flow elbow cooperating with said inlet to accommodate a shallow level fluid flow, pump support means laterally supporting said pump assembly, a mounting bracket slidably engaging said pump support means to support the same, a tapered end portion on said pump support means facilitating engagement with said mounting bracket, a combination closure and flow discharge member secured to a wall of said fuel cell communicating a discharge flow therethrough, and longitudinally rigid conduit means communicating the outlet of said pump assembly with said combination closure and flow discharge member, whereby said mounting bracket, pump and support means and rigid conduit means cooperate to maintain said pump assembly in a spaced, shallow level pumping relationship to the bottom wall of said fuel cell.

7. In combination with a tank having top, bottom and side walls and an access hole in the top wall, a motor driven pump unit plugged into said tank, said unit including an inlet, an outlet, and a plug-in mounting portion, a plug-receptacle bracket mounted on the bottom wall of said tank adapted to engage the mounting portion of the unit and prevent lateral displacement of the unit in the tank, a rigid discharge tube extending upwardly from the outlet of said unit, a closure for the access hole attachable to the top wall of the tank, said closure having a fitting adapted to engage said tube in fixed sealed relation and receive fluid therefrom, and a removble outlet coupling attachable to said fitting for receiving fluid from the fitting and for conveying the discharge of the pump out of the tank, said rigid discharge tube providing the sole supporting connection between said unit and said closure, whereby said fitting of said closure acts through the rigid tube and said plug-receptacle acts through the plug-in mounting portion to cooperate in securing the pump unit in the tank and whereby removal of said closure from the top wall of the tank effects removal of said pump unit from the bracket on the bottom wall of the tank.

8. In combination with a fuel cell having top, bottom and side walls together with an access hole in the top wall and an outlet opening in the bottom wall, a coupling secured in the outlet hole to accommodate flow from the cell, a bracket in said cell remote from said coupling, a pump and motor unit having an inlet and an outlet, a projection on said unit adapted to telescopically engage said bracket, a rigid discharge tube fixedly connecting the pump outlet with said coupling and forming the sole supporting connection between the pump and motor unit and the coupling whereby said unit will be fixedly suspended in the tank between the bracket and coupling and can be removed through the access hole of the tank by removal of the tube from the coupling and by withdrawing the projection of the unit from the bracket.

9. A pump and motor fluid flow device adapted to be plugged into a tank or the like which comprises a pump member having a downwardly facing inlet and an outlet, a bracket adapted to be fixedly mounted in a tank for telescopically receiving a portion of said pump member to laterally stabilize the device in the tank, a rigid conduit extending from the outlet of the pump member, a discharge coupling attached to said conduit, means for sealingly connecting said coupling to a tank wall, said coupling coacting through said rigid conduit with said bracket to rigidly suspend the device in the tank with the inlet of the device spaced above and adjacent the bottom wall of the tank, and said rigid conduit forming the sole supporting connection between said device and said discharge coupling.

10. A pump and motor unit for insertion in a tank through an access opening remote from the desired position for the unit in the tank which comprises a casing for the unit having a downwardly facing pump inlet adapted to be submerged in fluid even at low fluid levels in the tank and a remote pump outlet, a rigid fluid conduit having one end secured to the casing and transmitting fluid from the pump outlet, an outlet fitting on the other end of said conduit adapted to be rigidly affixed to a wall of the tank, said rigid fluid conduit forming the sole supporting connection between said pump and motor unit and said outlet fitting, a bracket for fixed mounting in the tank adjacent the desired position for the unit in the tank, means on the casing seating in said bracket to coact therewith for laterally stablizing the unit in the tank, and said rigid conduit, outlet fitting and bracket coacting to secure the unit in the tank with the pump inlet adjacent and facing the bottom of the tank.

11. In combination, a tank for liquid, a housing in said tank having an inlet opening facing the tank bottom and an outlet opening remote from the inlet opening, a pump and drive means therefor in said housing, rigid outlet conduit means having one end connected to said housing adjacent said outlet to receive fluid from the outlet and having the opposite end connected to a wall of said tank to support said housing and its contents within said tank and to deliver fluid from the housing to the tank wall, said conduit means providing the sole supporting connection between said housing and said wall of the tank, a bracket in the tank, means on the housing fitting in the bracket, and said bracket and means coacting to stabilize the housing laterally in the tank.

References Cited in the file of this patent

UNITED STATES PATENTS

| | | |
|---|---|---|
| 1,385,307 | Condon | July 19, 1921 |
| 2,188,646 | Bunch | Jan. 30, 1940 |
| 2,319,934 | Korte et al. | May 25, 1943 |
| 2,352,958 | Lauer et al. | July 4, 1944 |
| 2,370,590 | Taylor | Feb. 27, 1945 |
| 2,606,696 | Miner | Aug. 12, 1952 |
| 2,721,677 | Meredew et al. | Oct. 25, 1955 |
| 2,807,395 | Korte | Sept. 24, 1957 |